United States Patent
Thumpudi et al.

(10) Patent No.: US 10,284,732 B2
(45) Date of Patent: May 7, 2019

(54) MASKING LATENCY IN USB PHOTO CAPTURE

(71) Applicant: Microsoft Technology Licensing, LLC, Redmond, WA (US)

(72) Inventors: Naveen Thumpudi, Redmond, WA (US); Louis-Philippe Bourret, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 42 days.

(21) Appl. No.: 15/365,578

(22) Filed: Nov. 30, 2016

(65) Prior Publication Data
US 2018/0152568 A1 May 31, 2018

(51) Int. Cl.
  *H04N 1/00* (2006.01)
  *G06F 13/42* (2006.01)
  *H04N 101/00* (2006.01)

(52) U.S. Cl.
  CPC ..... *H04N 1/00209* (2013.01); *G06F 13/4282* (2013.01); *H04N 2101/00* (2013.01); *H04N 2201/0049* (2013.01); *H04N 2201/0072* (2013.01)

(58) Field of Classification Search
  CPC ........ H04N 1/00209; H04N 2201/0072; G06F 13/4282
  See application file for complete search history.

(56) References Cited

U.S. PATENT DOCUMENTS

| 6,404,447 | B1 | 6/2002 | Kitagawa |
| 7,961,978 | B2 | 6/2011 | Edwards et al. |
| 2010/0048242 | A1 | 2/2010 | Rhoads et al. |
| 2011/0058036 | A1 | 3/2011 | Metzger et al. |
| 2012/0069222 | A1 | 3/2012 | Steinberg et al. |
| 2015/0089013 | A1* | 3/2015 | Matsui ............... G06F 15/167 709/213 |
| 2015/0170381 | A1 | 6/2015 | Liu et al. |
| 2016/0192035 | A1* | 6/2016 | Maisenbacher .... H04N 21/8153 725/93 |
| 2017/0171616 | A1* | 6/2017 | Pathak ............... H04N 21/454 |

FOREIGN PATENT DOCUMENTS

JP  2014053706 A  3/2014

OTHER PUBLICATIONS

"OPC hack and make project", https://opc.olympus-imaging.com/en_sdkdocs/data/Guideline/guideline_push.html, Retrieved on: Oct. 20, 2016, 6 pages.

(Continued)

*Primary Examiner* — Christopher K Peterson
(74) *Attorney, Agent, or Firm* — Arent Fox LLP (57) ABSTRACT

Methods and devices for masking latency may include detecting a pause in receiving an image stream from an imaging device and generating one or more virtual image frames, each including a status indicator to indicate a status of the imaging device when the pause in receiving the image stream is detected. The methods and devices may also include generating, at the operating system, a data stream with the one or more virtual image frames inserted after a last image frame of the received image stream. In addition, the methods and devices may include transmitting the data stream to an application.

20 Claims, 4 Drawing Sheets

(56) References Cited

OTHER PUBLICATIONS

"Design & Reuse: Understanding—and Reducing—Latency in Video Compression Systems", http://www.design-reuse.com/articles/33005/understanding-latency-in-video-compression-systems.html, Retrieved on: Oct. 20, 2016, 6 pages.

Guggi, et al., "Reducing Processing Delay in Dataflow-oriented Middleware Systems for Smart Camera Applications", In Proceedings of the International Conference on Distributed Smart Cameras, Nov. 4, 2014, 7 pages.

* cited by examiner

MASKING LATENCY IN USB PHOTO CAPTURE

BACKGROUND

The present disclosure relates to a computer device, and more particularly, to photo and video capture.

Computing devices are often equipped with cameras for capturing digital photos/videos for storing on the computing device or other repositories for subsequent viewing. In the process of capturing images, whether for preview on a display of the computing device before taking a photo or starting video, or subsequent to taking a photo or starting video, the camera may perform processing of the images (e.g., for auto-focus, white balance, or other functions) or reprogram the hardware momentarily (e.g., set a new resolution on the camera sensor to capture a photo that cannot be used for previewing or video recording). This processing may use a significant amount of resources such that the camera may be unable to capture additional images until at least some of the processing is completed. When a user is operating the camera, this may manifest as a pause in a stream of images that are being displayed by the computing device in near real time. This pause may occur when the user is using the display of the device as a viewfinder for the camera and/or subsequent to taking a picture or starting video recording. This may lead to some user confusion as to what is happening at the computing device, such as whether a command to take a picture or start video recording (e.g., pressing a shutter button) was detected by the device, or if there is some other problem.

Thus, there is a need in the art for improvements in camera processing.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, a processor in communication with the memory, and an operating system in communication with the memory and processor. The operating system may be operable to detect a pause in receiving an image stream from an imaging device, generate one or more virtual image frames, each including a status indicator to indicate a status of the imaging device, when the pause in receiving the image stream is detected, generate a data stream with the one or more virtual image frames inserted after a last image frame of the received image stream, and transmit the data stream to an application.

Another example implementation relates to a method for masking latency. The method may include detecting, at an operating system executing on a computer device, a pause in receiving an image stream from an imaging device. The method may also include generating, at the operating system, one or more virtual image frames, each including a status indicator to indicate a status of the imaging device when the pause in receiving the image stream is detected. The method may also include generating, at the operating system, a data stream with the one or more virtual image frames inserted after a last image frame of the received image stream. In addition, the method may include transmitting the data stream to an application.

Another example implementation relates to computer-readable medium storing instructions executable by a computer device. The computer-readable medium may include at least one instruction for causing the computer device to detect a pause in receiving an image stream from an imaging device. The computer-readable medium may include at least one instruction for causing the computer device to generate one or more virtual image frames, each including a status indicator to indicate a status of the imaging device when the pause in receiving the image stream is detected. The computer-readable medium may include at least one instruction for causing the computer device to generate a data stream with the one or more virtual image frames inserted after a last image frame of the received image stream. The computer-readable medium may include at least one instruction for causing the computer device to transmit the data stream to an application.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

The present disclosure provides systems and methods for masking latency in a camera during capturing and processing images by detecting when the camera is processing an image stream and not actively capturing additional images for providing in an image stream. The systems and methods may generate virtual image frames that indicate a camera status and insert the generated virtual image frames into the image stream. As such, the camera status may be displayed to the user. In addition, the systems and methods may stop the insertion of the generated virtual image frames when it is determined that the camera is again actively capturing and supplying images for the image stream at the expected framerate. Thus, a computing device displaying images from the camera can display captured images, and when the camera is processing and unable to provide images in the stream, the computing device may display virtual images that are generated to indicate the camera status.

In an implementation, the generated images may be inserted into the image stream below the application layer to provide the functionality regardless of the application using the camera to display images. As such, the application receives a continuous data stream at the same frame rate from the computing device even though there may be a pause in the image stream received from the camera while the camera is processing the image stream.

Figure 1:
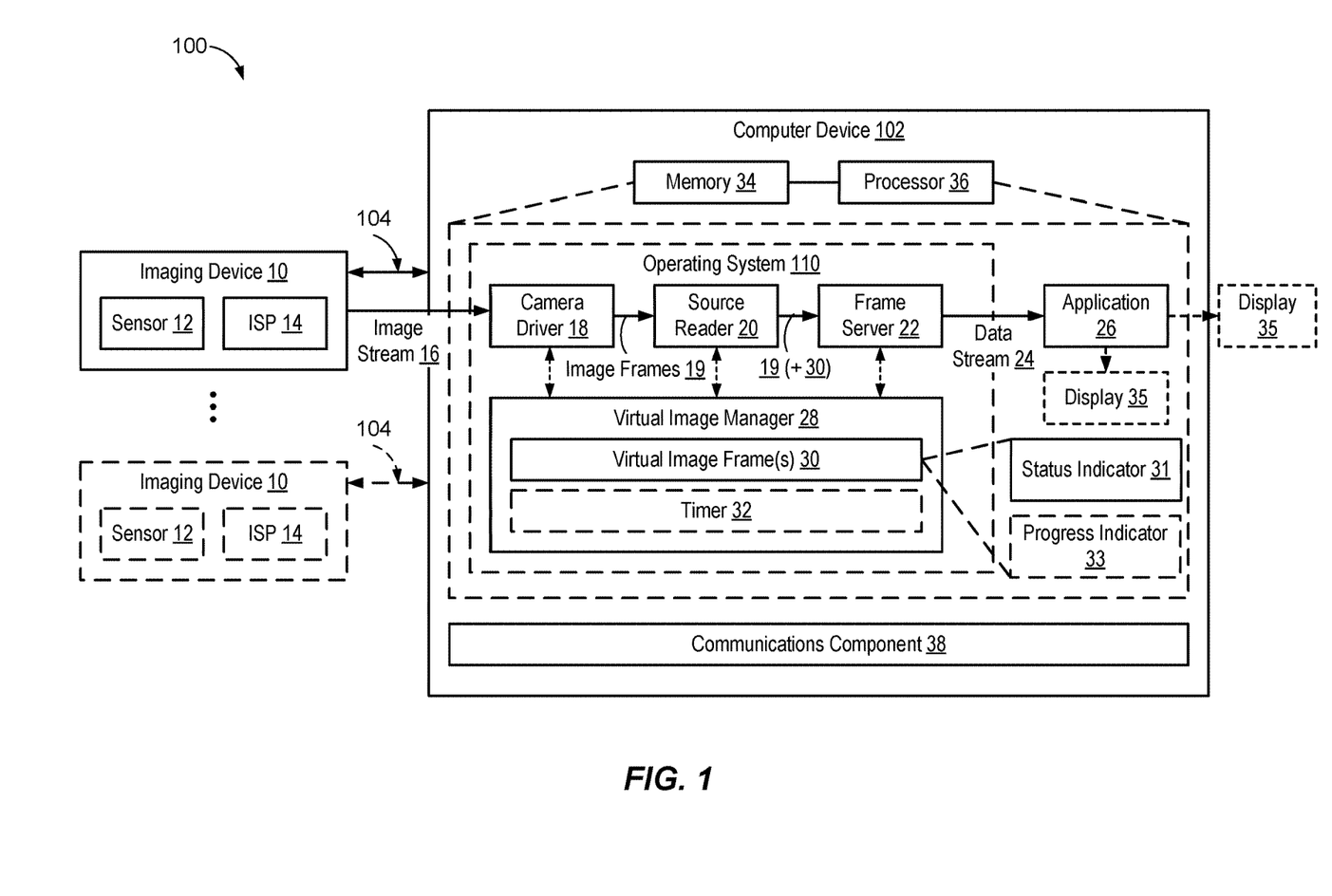
FIG. 1 is a schematic block diagram of an example device in accordance with an implementation of the present disclosure.

Referring now to FIG. 1, an example system 100 for capturing and processing images may include one or more imaging devices 10 in communication with computer device 102, such as via a communication link 104 with a communication component 38. Imaging device 10 may include one or more sensors 12 that capture images. Sensors 12 may include, but are not limited to, an infrared (IR) sensor, a color sensor, such as a red green blue (RGB) sensor, a monochrome sensor, a depth sensor, a thermal sensor, or any other type of camera sensor. In addition, imaging device 10 may include an image signal processor (ISP) 14 to process the captured images. For example, ISP 14 may adjust the exposure, white balance, ISO, and focus, among other image processing that may occur. Imaging device 10 may capture and transmit image data of a scene to computer device 102, including an image stream 16 of data that may define a video and/or a photo.

Imaging device 10 may include any device that may be used to capture and/or manipulate images, video, and video-related functionality, such as, but not limited to, desktop video cameras (webcams), digital camcorders, analog video converters, analog and digital television tuners, still image cameras that support video streaming, or any device having one or more sensors 12. Example imaging devices 10 may include a red green blue (RGB) camera, an infrared (IR) camera, or a depth camera, or any other type of device having a sensor associated with acquiring image data. Further, for example, imaging device 10 may be any USB video device as defined by the Universal Serial Bus Device Class Definition for Video Devices specification published by the USB Implementers Forum, Inc. In a USB example, the communication link 104 may be a cable having a Universal Serial Bus (USB) connector, and the communication component 50 may include a USB IN endpoint on a USB interface to which the USB connector may be communicatively coupled.

Computer device 102 in accordance with the present disclosure may include an operating system 110 executed by processor 36 and/or memory 34 of computer device 102. Memory 34 may be configured for storing data and/or computer-executable instructions defining and/or associated with operating system 110, and processor 36 may execute operating system 110. An example of memory 34 can include, but is not limited to, a type of memory usable by a computer, such as random access memory (RAM), read only memory (ROM), tapes, magnetic discs, optical discs, volatile memory, non-volatile memory, and any combination thereof. An example of processor 36 can include, but is not limited to, any processor specially programmed as described herein, including a controller, microcontroller, application specific integrated circuit (ASIC), field programmable gate array (FPGA), system on chip (SoC), or other programmable logic or state machine.

Computer device 102 may include any mobile or fixed computer device, which may be connectable to a network. Computer device 102 may be, for example, a computer device such as a desktop or laptop or tablet computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

In an implementation, operating system 110 may include a camera driver 18 that receives image stream 16 data from imaging device 10 and that allows interaction between ISP 14 and operating system 110. Camera driver 18 may be a device driver that operates or controls a particular type of imaging device 10. In some examples, camera driver 18 may provide a software interface to the hardware of the camera device, enabling the operating systems and other computer programs to access the hardware functions without needing to know precise details of the hardware. For instance, the data of image stream 16 may be in the form of a series of image frames 16 received from imaging device 10. The series of image frames 19 may be provided at a certain frame rate. For example, the frame rate may be determined by the configuration of the device and the prevailing lighting conditions. Accordingly, camera driver 18 may provide image stream 16 to operating system 110 in the form of the series of image frames 19. In an implementation, the buffers for image frames may be allocated and provided to imaging device 10 by camera driver 18 so that amount of data copying is minimized, while in another implementation, image frame data from imaging device 10 may be copied over to outgoing image frames by camera driver 18. In one implementation, the image frames may contain compressed data, while in another implementation, image frames may contain uncompressed data.

In addition, operating system 110 may include a source reader/writer 20 for providing images from camera driver 18 to a frame server 22, which can gather image frames 19 for providing to the application 26 as a data stream 24. Also, operating system 110 includes a virtual image manager 28 that may supplement the captured image stream 16 with one or more virtual image frames 30 to account for delays in providing data stream 24 to one or more applications 26 with image frames 19 from image stream 16.

For example, virtual image manager 28 may communicate with any one or more of camera driver 18, source reader 20, and frame server 22. In addition, virtual image manager 28 may determine whether the imaging device 10 is capturing an image. For example, when a pause (e.g., latency) occurs in receiving image stream 16 from imaging device 10, virtual image manager 28 may determine that imaging device 10 is not capturing an image. Virtual image manager 28 may receive a notification of a delay in processing by imaging device 10 (e.g., based on detecting a break in receiving image stream 16 data) or can otherwise receive the notification from the imaging device 10 or component thereof, such as ISP 14. For example, when a next frame in the image stream 16 has not been received by camera driver 18, virtual image manager 28 may determine that image stream 16 is delayed and/or has stopped. For instance, image stream 16 may be delayed from imaging device 10 when imaging device 10 is reconfiguring a sensor 12 to a different resolution or different mode. For example, when imaging device 10 is transitioning from one state to a different state, imaging device 10 may stop transmission of image stream 16. Image stream 16 may also be delayed from imaging device 10 because of bandwidth constraints. For example, a high-resolution image may exceed a frame rate that may be supported by a USB connection and imaging device 10 may be unable to transmit image stream 16 at the appropriate frame rate. In addition, image stream 16 may be delayed from imaging device 10 for image processing. Image stream 16 may also be delayed from imaging device 10 during a transition between different imaging devices 10. For example, if computer device 102 is in communication with a bank of surveillance imaging devices 10, image stream 16 may be stopped and/or delayed during a transition from one imaging device 10 to another imaging device 10.

In addition, virtual image manager 28 may generate one or more virtual image frames 30 to insert into the image stream 16. Virtual image frames 30 may include one or more frames composed of pixel data, which may be altered or not altered, from previous image stream frame(s) received from imaging device 10 and added new elements. In addition, virtual image frames 30 may include one or more frames completely composed of new elements (e.g., elements not previously transmitted by imaging device 10).

Virtual image frames 30 may also include a status indicator 31 and, optionally, a progress indicator 33. Status indicator 31 may include, but is not limited to, an alphanumeric and/or graphical indication such as a message or other indicator as to a status of imaging device 10, a grayed-out version of the last image from the imaging device 10 before the processing event, or some other indicator that the imaging device 10 is temporarily not available for capturing images. Progress indicator 33 may include, but is not limited to, an alphanumeric and/or graphical indication such as an estimated time or an amount of progress made corresponding to processing associated with the delay (e.g., a progress indicator over multiple frames) that indicates when the imaging device 10 may become available. For instance, in some implementations, virtual image manager 28 may start a timer 32 when virtual image manager 28 determines that a delay has occurred in receiving image stream 16, where an expiration time of timer 32 corresponds to an expected end of the delay (and, hence, can be used to determine progress indicator 33). In one implementation, the expected delay is learned based on prior instances of pauses when pictures are taken, while in another implementation, the device is able to advertise the expected delay through a side control channel that camera driver 18 on computer device 102 is able to query. In another implementation, virtual image manager 28 may monitor communications between camera driver 18 and imaging device 10, where a sequence of sub-operations are expected to be executed and succeed in order to complete the operation that causes a hang in image stream 16. The sub-operations may have a maximum time latency allowed to complete until a timeout error is declared. Therefore, the estimated time to completion may be the result of an addition of maximum time for each sub-operation.

In addition, virtual image manager 28 may generate virtual image frames 30 at the same, or approximately the same, frame rate and same resolution as the series of image frames 19 from image stream 16 so that data stream 24 may be generated with the virtual image frames 30 inserted into image stream 16 for the time corresponding to the delay. Data stream 24 may be transmitted to one or more of camera driver 18, source reader 20, and/or frame server 22.

In addition, data stream 24 may be transmitted to one or more applications 26. Because the virtual image frames 30 may be generated at approximately the same frame rate and same resolution as image stream 16, application 26 may receive a continuous data stream 24 (e.g., a continuous series of frames at a certain frame rate) with image data even though the image stream 16 may be delayed from imaging device 10. As such, instead of a pause occurring in a display by application 26, application 26 may cause display the data stream 24 on a display 35, which may be located on computing device 102 or which may be separate from but in communication with computing device 102, as if the image frames were captured from the imaging device 10, and without knowledge that the frames are artificial frames generated to indicate the camera status.

Virtual image manager 28 may stop the generation of virtual image frames 30 and the inclusion of the virtual image frames 30 into data stream 24 when virtual image manager 28 determines that imaging device 10 is again capturing images and forwarding them to camera driver 18. For example, when virtual image manager 28 detects the resuming of image steam 16 being received from the imaging device 10, virtual image manager 28 may stop the generation and insertion of virtual image frames 30 into data stream 24. As such, data stream 24 may only include image frames 30 from image stream 16 data and application 26 may cause the display the image frames 30 received from imaging device 10, such displaying as an image or video preview.

In addition, virtual image manager 28 may stop the timer 32 when virtual image manager 28 determines that imaging device 10 is again capturing images. As such, virtual image manger 28 may determine a delay time for when imaging device 10 was unable to provide image stream 16 to computer device 102. In an implementation, virtual image manager 28 may determine an error has occurred in the image processing when a delay time exceeds a predetermined time. For example, if the delay time exceeds five seconds, virtual image manager 28 may generate a notification indicating than an error may have occurred.

Figure 2:
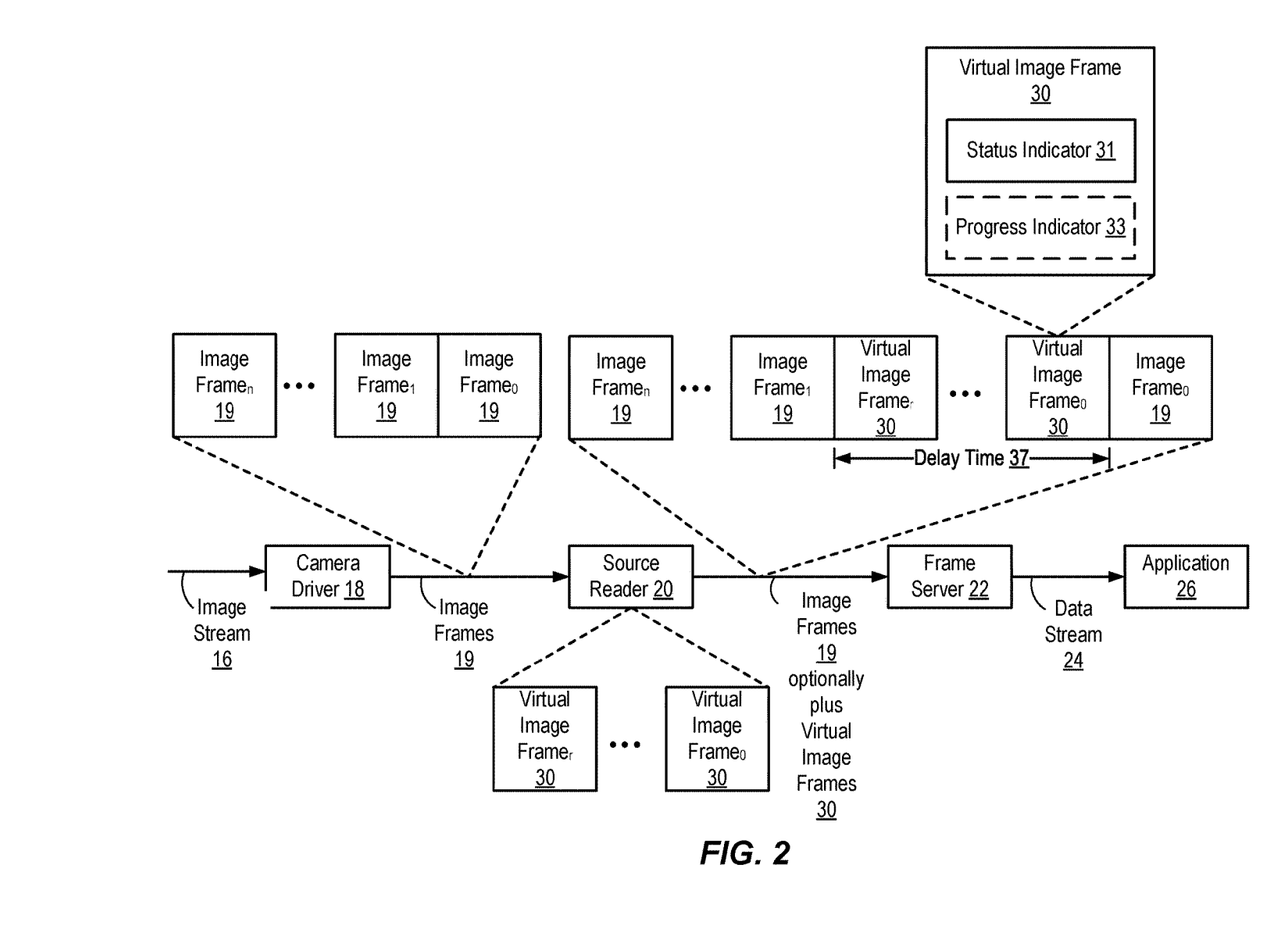
FIG. 2 is a schematic block diagram of an example of processing an image stream into a data stream, including transforming the image stream into a series of image frames and inserting virtual image frames within the series of image frames when a delay (e.g., latency) occurs, in accordance with an implementation of the present disclosure.

Referring now to FIG. 2, an example data stream 24 generated by computer device 102 may include one or more (e.g., 1 to n, where n is an integer) image frames 30 from image stream data 16 received from imaging device 10 and one or more (e.g., 1 to r, where r is an integer) virtual frames 30 during a delay time 37. For instance, delay time 37 corresponds to a delay or latency in imaging device 10 capturing new data for image stream 16 that is provided to camera driver 18. A time period of delay time 37 may indicate an amount of time of a processing delay of imaging device 10 (FIG. 1). For example, in FIG. 2, a delay occurs after a first image frame (e.g., Image Frame$_0$) and continues for delay time 37, during which virtual frame manager 28 generates and inserts one or more virtual data frames 30 (e.g., Virtual Image Frame$_0$ through Virtual Image Framer) into data stream 24. When the processing delay is completed, e.g., at a second image frame (e.g., Image Frame$_1$), virtual frame manager 28 may cease the generation and insertion of virtual data frames 30 into data stream 24, and thus data stream 24 may again include only image frames 19 from image stream 16 data from imaging device 10.

Figure 3:
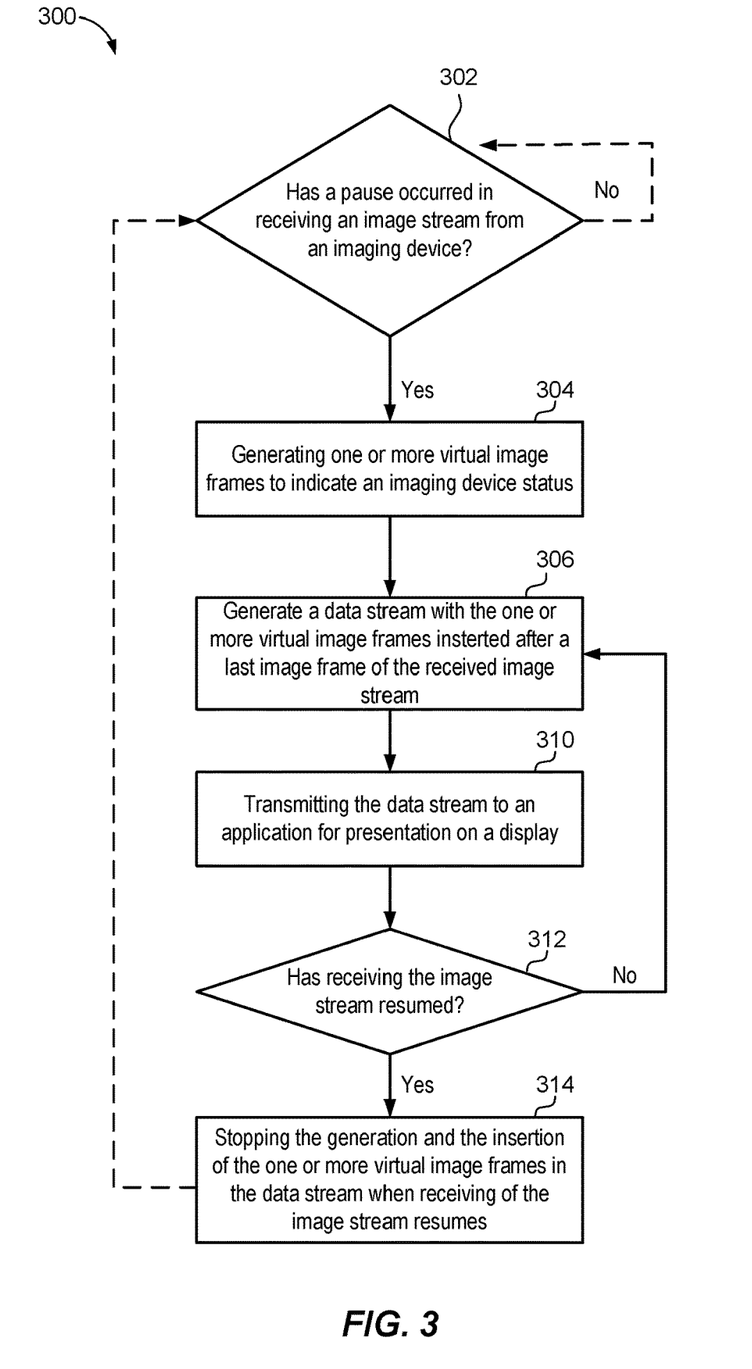
FIG. 3 is a flow chart of a method for masking latency in accordance with an implementation of the present disclosure.

Referring now to FIG. 3, an example method 300 is illustrated for masking latency that may be executed by operating system 110 (FIG. 1) on computer device 102 (FIG. 1).

At 302, method 300 may include determining whether a pause occurred in receiving an image stream 16 (FIG. 1) from an imaging device 10 (FIG. 1). For example, virtual image manager 28 may determine that a paused occurred in receiving an image stream by receiving a notification of a delay in processing by imaging device 10 (e.g., based on detecting a break in receiving image stream 16 data). Virtual image manager 28 may also receive the notification from the imaging device 10 or component thereof, such as ISP 14.

At 304, method 300 may include generating one or more virtual image frames to indicate an imaging device status. The one or more virtual image frames may include one or more frames composed of pixel data, which may be altered or not altered, from previous image stream frame(s) received from the imaging device and added new elements (e.g., virtual images). In addition, the one or more virtual image frames may include one or more frames completely composed of new elements not previously transmitted by the imaging device (e.g., a synthetic image frame). For example, virtual image manager 28 may generate one or more virtual image frames 30, each including a status indicator to indicate a status of an imaging device, when virtual image manger 28 determines that a pause occurred in receiving an image stream 16 from imaging device 10. Virtual image frames 30 may include, for example, a status indicator that indicates imaging device 10 is busy or a progress indicator that indicates an estimate of an expected delay.

At 306, method 300 may also include generating a data stream with the one or more virtual image frames inserted after a last image frame of the received image stream. For example, virtual image manager 28 may generate a data stream 24 that includes the one or more virtual image frames 30 inserted after a last image frame of the received image stream 16.

At 310, method 300 may include transmitting the data stream to an application for presentation on a display. Data stream 24 may be transmitted to one or more applications 26 so that applications 26 may receive a continuous data stream 24 (e.g., a continuous series of frames at a certain frame rate) with image data to potentially present on a display 35 even though the image stream 16 may be delayed from imaging device 10. As such, instead of a pause occurring in a display by application 26, application 26 may cause display the data stream 24 on a display, which may be located on computing device 102 or which may be separate from but in communication with computing device 102, as if the image frames were captured from the imaging device 10, and without knowledge that the frames are artificial frames generated to indicate the camera status At 312, method 300 may also include determining whether receiving the imaging stream has resumed. Virtual image manager 28 may receive a notification from imaging device 10, camera driver 18, source reader 20, and/or frame server 22 indicating that computing device 102 is again receiving a real image stream.

At 314, method 300 may include stopping the generation and the insertion of the one or more virtual image frames in the data stream when receiving of the image stream resumes. For example, when virtual image manager 28 detects the resuming of image steam 16 being received from the imaging device 10, virtual image manager 28 may stop the generation and insertion of virtual image frames 30 into data stream 24. As such, data stream 24 may only include image frames 30 from image stream 16 data and application 26 may cause the display the image frames 30 received from imaging device 10, such displaying as an image or video preview.

Figure 4:
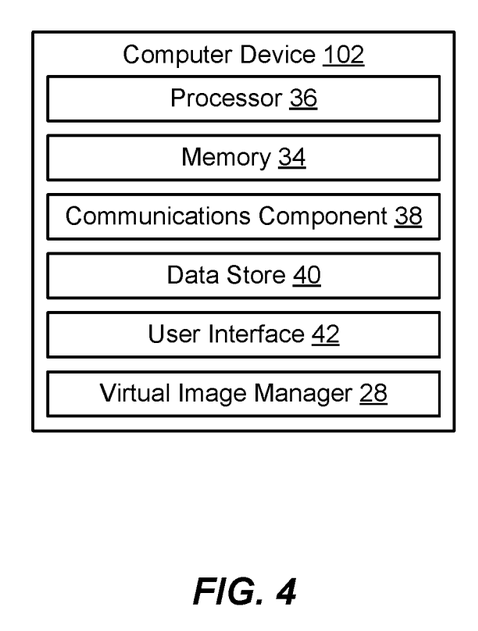
FIG. 4 is a schematic block diagram of an example device in accordance with an implementation of the present disclosure.

Referring now to FIG. 4, illustrated is an example computer device 102 in accordance with an implementation, including additional component details as compared to FIG. 1. In one example, computer device 102 may include processor 36 for carrying out processing functions associated with one or more of components and functions described herein. Processor 36 can include a single or multiple set of processors or multi-core processors. Moreover, processor 36 can be implemented as an integrated processing system and/or a distributed processing system.

Computer device 102 may further include memory 34, such as for storing local versions of applications being executed by processor 36. Memory 34 can include a type of memory usable by a computer, such as random access memory (RAM), read only memory (ROM), tapes, magnetic discs, optical discs, volatile memory, non-volatile memory, and any combination thereof. Additionally, processor 36 and memory 34 may include and execute operating system 110 (FIG. 1).

Further, computer device 102 may include a communications component 38 that provides for establishing and maintaining communications with one or more parties utilizing hardware, software, and services as described herein. Communications component 38 may carry communications between components on computer device 102, as well as between computer device 102 and external devices, such as devices located across a communications network and/or devices serially or locally connected to computer device 102. For example, communications component 38 may include one or more buses, and may further include transmit chain components and receive chain components associated with a transmitter and receiver, respectively, operable for interfacing with external devices.

Additionally, computer device 102 may include a data store 40, which can be any suitable combination of hardware and/or software, that provides for mass storage of information, databases, and programs employed in connection with implementations described herein. For example, data store 40 may be a data repository for applications 26 (FIG. 1), data stream 24 (FIG. 1), virtual image manager 28 (FIG. 1), and/or image stream 16 (FIG. 1).

Computer device 102 may also include a user interface component 42 operable to receive inputs from a user of computer device 102 and further operable to generate outputs for presentation to the user. User interface component 42 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 42 may include one or more output devices, including but not limited to a display, a speaker, a haptic feedback mechanism, a printer, any other mechanism capable of presenting an output to a user, or any combination thereof.

Computer device 102 may additionally include a virtual image manager 28 configured to process the captured image stream 16 (FIG. 1) and transmit a data stream 24 (FIG. 1) to one or more applications 26 (FIG. 1). In an implementation, user interface component 42 may transmit and/or receive messages corresponding to the operation of virtual image manager 28, imaging device 10 (FIG. 1) and/or applications 26. In addition, processor 36 executes virtual image manager 28 and/or applications 26, and memory 34 or data store 40 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various implementations are described herein in connection with a device (e.g., computer device 102), which can be a wired device or a wireless device. A wireless device may be a cellular telephone, a satellite phone, a cordless telephone, a Session Initiation Protocol (SIP) phone, a wireless local loop (WLL) station, a personal digital assistant (PDA), a handheld device having wireless connection capability, a computer device, a mixed reality or virtual reality device, or other processing devices connected to a wireless modem.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:
1. A computer device, comprising:
a memory to store data and instructions;
a processor in communication with the memory;
an imaging device in communication with the memory and the processor; and
an operating system in communication with the memory, the processor, and the imaging device, wherein the operating system is operable to:
determine whether the imaging device is capturing an image;
detect a pause in receiving an image stream from an imaging device when the imaging device is not capturing the image for the image stream;
identify an expected delay for the pause in receiving the image stream;
generate one or more virtual image frames, each including a status indicator to indicate a status of the imaging device based on the expected delay, in response to the pause in receiving the image stream is detected;
generate a data stream with the one or more virtual image frames inserted after a last image frame of the received image stream;

transmit the data stream to an application; and
stop the generation and insertion of the one or more virtual images in the data stream when the imaging device is capturing images for the image stream.

2. The computer device of claim 1, wherein the operating system is further operable to stop the generation and insertion of the one or more virtual image frames in the data stream in response to detecting a resumption of receiving of a real image stream.

3. The computer device of claim 1, wherein the data stream transmitted to the application is presented on a display.

4. The computer device of claim 1, wherein when the imaging device is capturing the image, the data stream transmitted to the application includes the data from the received image stream.

5. The computer device of claim 1, wherein the one or more virtual image frames are generated at approximately a same frame rate as the received image stream.

6. The computer device of claim 1, wherein the status indicator indicates the imaging device is busy.

7. The computer device of claim 1, wherein the one or more virtual image frames include a progress indicator that indicates when the imaging device will become available.

8. The computer device of claim 1, wherein the pause occurs in receiving the image stream when the imaging device is processing an image, when the imaging device is reconfiguring a sensor to a different resolution, during a transition from the imaging device to another imaging device, or any combination thereof.

9. The computer device of claim 1, wherein the pause occurs in receiving the image stream due to bandwidth constraints of the imaging device.

10. The computer device of claim 1, wherein the operating system is further operable to identify the expected delay through one or more of learning the expected delay based on prior instances of pauses when images are taken, receiving information from the imaging device about the expected delay, or determining a maximum time latency for sub-operations for an imaging operation.

11. A method for masking latency, comprising:
determining whether the imaging device is capturing an image;
detecting, at an operating system executing on a computer device, a pause in receiving an image stream from an imaging device when the imaging device is not capturing the image for the image stream;
identifying an expected delay for the pause in receiving the image stream;
generating, at the operating system, one or more virtual image frames, each including a status indicator to indicate a status of the imaging device based on the expected delay, in response to the pause in receiving the image stream is detected;
generating, at the operating system, a data stream with the one or more virtual image frames inserted after a last image frame of the received image stream;
transmitting the data stream to an application; and
stopping the generation and insertion of the one or more virtual images in the data stream when the imaging device is capturing images for the image stream.

12. The method of claim 11, further comprising:
stopping the generation and insertion of the one or more virtual image frames in the data stream in response to detecting a resumption of receiving of a real image stream.

13. The method of claim 11, wherein the data stream transmitted to the application is presented on a display, or wherein when the imaging device is capturing the image, the data stream transmitted to the application includes the data from the received image stream.

14. The method of claim 11, wherein the one or more virtual image frames are generated at approximately a same frame rate as the received image stream.

15. The method of claim 11, wherein the status indicator indicates the imaging device is busy.

16. The method of claim 11, wherein the one or more virtual image frames include a progress indicator that indicates when the imaging device will become available.

17. The method of claim 11, wherein the pause occurs in receiving the image stream when the imaging device is processing an image, when the imaging device is reconfiguring a sensor to a different resolution, during a transition from the imaging device to another imaging device, or any combination thereof.

18. The method of claim 11, wherein the pause occurs in receiving the image stream due to bandwidth constraints of the imaging device.

19. The method of claim 11, wherein identifying the expected delay includes one or more of learning the expected delay based on prior instances of pauses when images are taken, receiving information from the imaging device about the expected delay, or determining a maximum time latency for sub-operations for an imaging operation.

20. A non-transitory computer-readable medium storing instructions executable by a computer device, comprising:
at least one instruction for causing the computer device to determine whether the imaging device is capturing an image;
at least one instruction for causing the computer device to detect a pause in receiving an image stream from an imaging device when the imaging device is not capturing the image for the image stream;
at least one instruction for causing the computer device to identify an expected delay for the pause in receiving the image stream;
at least one instruction for causing the computer device to generate one or more virtual image frames, each including a status indicator to indicate a status of the imaging device as on the expected delay, in response to the pause in receiving the image stream is detected;
at least one instruction for causing the computer device to generate a data stream with the one or more virtual image frames inserted after a last image frame of the received image stream;
at least one instruction for causing the computer device to transmit the data stream to an application; and
at least one instruction for causing the computer device to stop the generation and insertion of the one or more virtual images in the data stream when the imaging device is capturing images for the image stream.

* * * * *